(12) United States Patent
Post et al.

(10) Patent No.: US 8,719,486 B2
(45) Date of Patent: May 6, 2014

(54) PINNING CONTENT IN NONVOLATILE MEMORY

(75) Inventors: Samuel D. Post, Folsom, CA (US); Jared E. Hulbert, Shingle Springs, CA (US)

(73) Assignee: Micron Technology, Inc., Boise, ID (US)

( * ) Notice: Subject to any disclaimer, the term of this patent is extended or adjusted under 35 U.S.C. 154(b) by 256 days.

(21) Appl. No.: 12/490,501

(22) Filed: Jun. 24, 2009

(65) Prior Publication Data
US 2010/0332725 A1 Dec. 30, 2010

(51) Int. Cl.
*G06F 3/01* (2006.01)
(52) U.S. Cl.
USPC .......................................... 711/103
(58) Field of Classification Search
CPC ............... G06F 12/0246; G06F 3/01
See application file for complete search history.

(56) References Cited

U.S. PATENT DOCUMENTS

| | | | |
|---|---|---|---|
| 7,490,197 B2 * | 2/2009 | Kirshenbaum et al. | 711/112 |
| 2003/0225972 A1 * | 12/2003 | Miyata et al. | 711/118 |
| 2005/0132129 A1 * | 6/2005 | Venkiteswaran | 711/103 |
| 2005/0283573 A1 * | 12/2005 | Mewhinney et al. | 711/136 |
| 2006/0064684 A1 * | 3/2006 | Royer et al. | 717/168 |
| 2008/0068897 A1 * | 3/2008 | Lee et al. | 365/189.02 |
| 2008/0162821 A1 * | 7/2008 | Duran et al. | 711/133 |
| 2009/0089501 A1 * | 4/2009 | Ahn et al. | 711/113 |

OTHER PUBLICATIONS

FAT: Gereal Overview of On-Disk Format, Microsoft Corporation, May 5, 1999.*

* cited by examiner

*Primary Examiner* — Duc Doan
(74) *Attorney, Agent, or Firm* — Dorsey & Whitney LLP

(57) ABSTRACT

Systems and methods relating to pinning selected data to sectors in non-volatile memory. A graphical user interface allows a user to specify certain data (e.g., directories or files) to be pinned. A list of pinned sectors can be stored so that a driver or controller that operates on a sector basis and not a file or directory basis can identify data to be pinned.

18 Claims, 8 Drawing Sheets

PINNING CONTENT IN NONVOLATILE MEMORY

FIELD

The present invention relates generally to data storage, and more specifically to data storage in nonvolatile memory.

BACKGROUND

Many computer systems include system memory and storage media for information storage. The system memory typically includes volatile memory (meaning that the information is lost when the memory has no power). Examples include dynamic random access memory (DRAM) and static random access memory (SRAM). Storage media typically includes magnetic or optical media such as hard disk drives, and typically has much slower access times than system memory.

BRIEF DESCRIPTION OF THE DRAWINGS

Embodiments of the invention are illustrated by way of example and not limitation in the figures of the accompanying drawings, in which like reference numerals indicate similar elements and in which.

DESCRIPTION OF EMBODIMENTS

Figure 1:
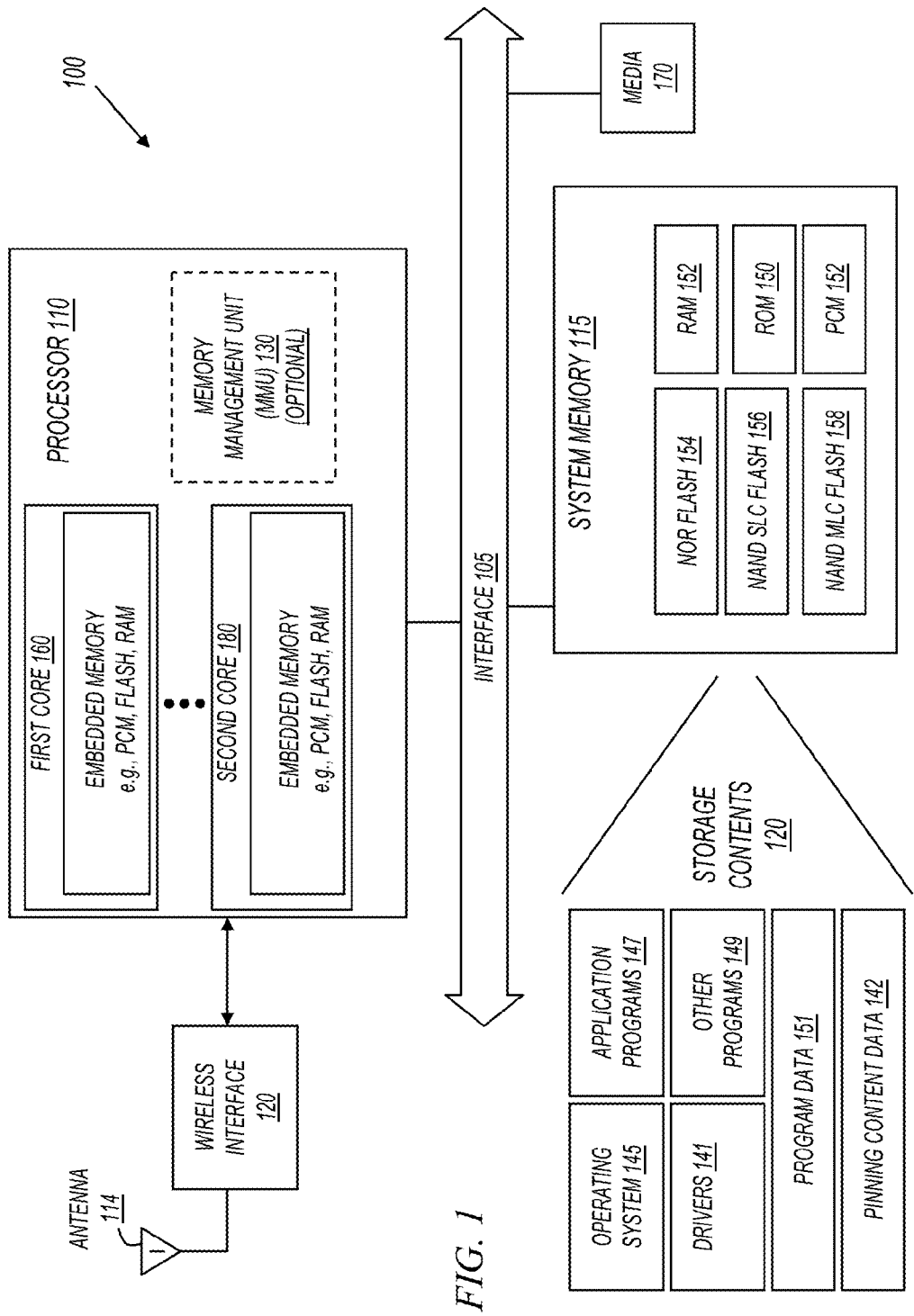
FIG. 1 shows a system in accordance with various embodiments of the invention.

FIG. 1 shows a system 100 in accordance with various embodiments of the invention. System 100 may be any type of system with memory. For example, system 100 may be a mobile phone with volatile and nonvolatile memory. Also for example, system 100 may be a global positioning system (GPS) receiver or a portable media player with volatile and nonvolatile memory. System 100 may be any type of device without departing from the scope of the present invention.

In some embodiments, system 100 has a wireless interface 120. Wireless interface 120 is coupled to antenna 114 to allow system 100 to communicate with other over-the-air communication devices. As such, system 100 may operate as a cellular device or a device that operates in wireless networks such as, for example, Wireless Fidelity (Wi-Fi) that provides the underlying technology of Wireless Local Area Network (WLAN) based on the IEEE 802.11 specifications, WiMax and Mobile WiMax based on IEEE 802.16-2005, Wideband Code Division Multiple Access (WCDMA), and Global System for Mobile Communications (GSM) networks, although the present invention is not limited to operate in only these networks. It should be understood that the scope of the present invention is not limited by the types of, the number of, or the frequency of the communication protocols that may be used by system 100. Embodiments are not, however, limited to wireless communication embodiments. Other non-wireless applications can use the various embodiments of the invention.

System 100 includes processor 110 coupled to interface 105. Interface 105 provides communication between processor 110 and the various other devices coupled to interface 105. For example, processor 110 may communicate with memory devices in system memory 115, as well as media 170. Interface 105 can include serial and/or parallel buses to share information along with control signal lines to be used to provide handshaking between processor 110 and the various other devices coupled to interface 105.

System memory 115 may include one or more different types of memory and may include both volatile (e.g., random access memory (RAM) 152) and nonvolatile memory (e.g., read only memory (ROM) 150, phase change memory (PCM) 152, NOR FLASH memory 154, NAND single level cell (SLC) memory 156, and NAND multi-level cell (MLC) memory 158). These memory types are listed as examples, and this list is not meant to be exclusive. For example, some embodiments may include Ovonic Unified Memory (OUM), Chalcogenide Random Access Memory (C-RAM), Magnetic Random Access Memory (MRAM), Ferroelectric Random Access Memory (FRAM), Static Random Access Memory (SRAM), Dynamic Random Access Memory (DRAM), or any other type of storage device.

System storage 115 provides storage for storage contents 120. Storage contents 120 may include operating system 145, application programs 147, drivers 141, other programs 149, program data 151, and pinning content data 142. One skilled in the art will appreciate that storage contents 120 may include anything that can be represented in a digital format, including any type of program, instructions, or data.

Different parts of storage contents 120 can be stored in different types of memories within system memory 115 as well as media 170. For example, drivers 141 may be stored in RAM 152, while program data 151 may be stored in NOR FLASH 154. In some embodiments, each component within storage contents 120 may be spread across multiple types of memory within system memory 115. For example, part of application programs 147 may be stored in RAM 152, while another part of application programs 147 may be stored in ROM 150, while still another part of application programs 147 may be stored in PCM 152. In general, any and all of storage contents 120 may be spread among the different types of memory within system storage 115.

Media 170 may be a magnetic disk drive, an optical storage drive, or the like. Any of the storage contents 120 may be stored on media 170. For example, application programs 147 and/or program data 151 may be stored on media 170. System 100 may include a non-volatile disk drive cache that stores data read from, or written to, media 170. The cache may be formed from any of the non-volatile memory within system memory 115. For example, a disk drive cache may be implemented using PCM 152 or any of FLASH memories 154, 156, or 158.

In some embodiments, non-volatile memory is also used to implement a virtual hard disk drive, referred to herein as a non-volatile memory (NVM) drive. For example, PCM 152 may be formatted and accessed in a manner that mimics the operation of a disk drive. The cost of storage in an NVM drive is generally higher than on an actual disk drive, but the performance tends to be much greater.

Various embodiments of the present invention allow a user of system 100 to specify which portions of storage contents 120 are to be stored, or "pinned," in an NVM drive. For example, a user may pin an application program in an NVM drive to increase performance of that particular application program. Also for example, a user may pin program data in an NVM drive. In addition to pinning based on user input, various embodiments of the present invention combine user controlled pinning and hard disk drive caching in non-volatile memory.

Drivers 141 are software components that provide low level control of devices within system 100. For example, drivers 141 provide low level read/write services when applications write to media 170. As described further below, drivers 141 may redirect writes intended for media 170 to either non-volatile cache or an NVM drive based on user inputs. Drivers 141 keep track of which data is pinned or cached using pinning content data 142. In some embodiments, pinning content data 142 may list disk sectors that are cached or pinned. When drivers 141 receive a request to write a particular sector to media 170, the pinning content data 142 is consulted to determine where to write the data (e.g., to media 170, to a non-volatile cache, or to an NVM drive).

In various embodiments, users have the ability to specify which files and/or directories are pinned in an NVM drive, giving manual control over the NVM contents to the user. This allows the user to identify specific files and/or applications that will be faster to load and execute, due to their presence in the faster NVM drive. Additionally, the user may wish to enable traditional caching (using a popular caching algorithm such as Least Recently Used, etc) for the sectors in non-volatile memory. For example, if the user has "pinned" 10 GB of data into NVM and the NVM drive is 16 GB, the remaining 6 GB of NVM may be used to cache other disk accesses in the traditional manner. This improves overall system performance while still guaranteeing specific applications will load quickly from NVM.

Processor 110 includes at least one core 160, 180, and each core may include memory. For example, first core 160 may include volatile or nonvolatile memory such as PCM, FLASH, or RAM. Each core may include any combination of different types of memory without departing from the scope of the present invention. Processor 110 may execute instructions from any suitable memory within system 100. For example, any of the memory devices within system memory 115 may be considered a computer-readable medium that has instructions stored that when accessed cause processor 110 to perform embodiments of the invention.

In some embodiments, processor 110 also includes an integral memory management unit (MMU) 130. In some embodiments, MMU 130 is a separate device. Memory management unit 130 is a hardware device or circuit that is responsible for handling accesses to memory requested by processor 110. When present, memory management unit 130 supports virtual memory and paging by translating virtual addresses into physical addresses.

Figure 2:
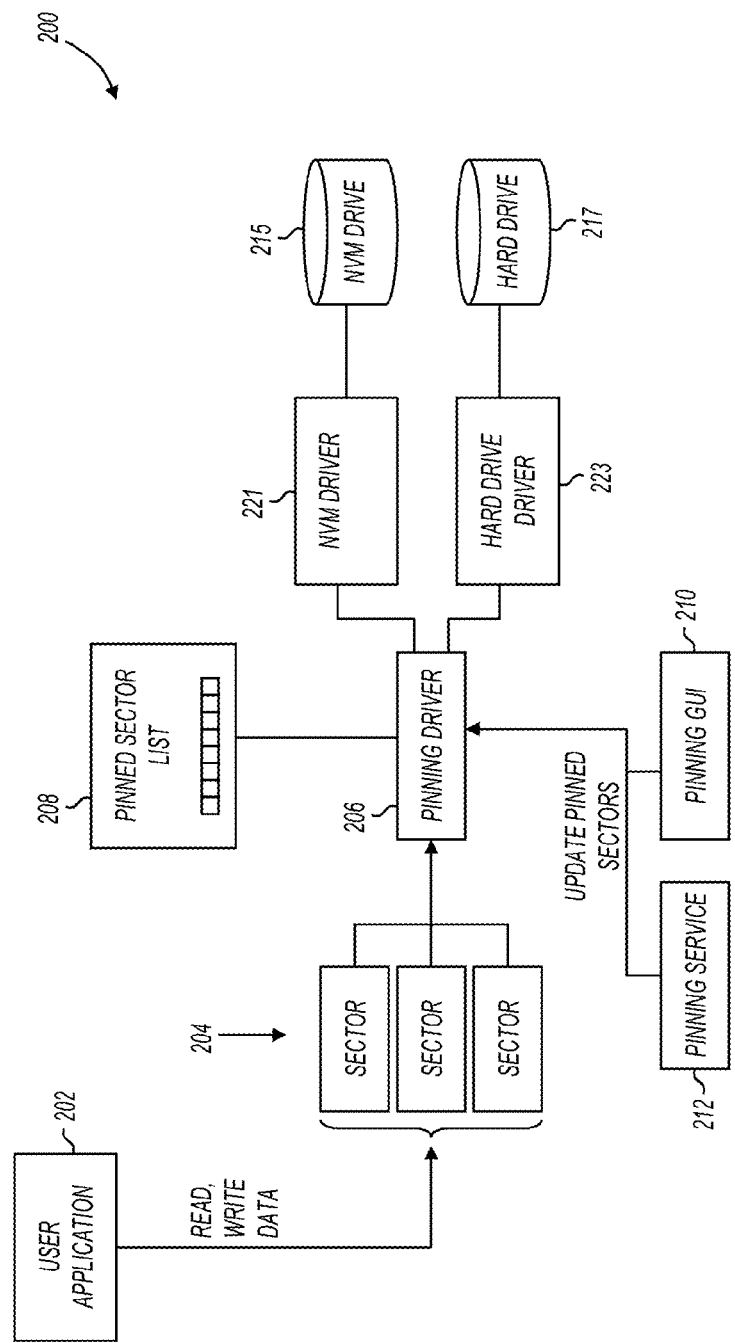
FIGS. 2 and 3 are block diagrams of user applications interacting with storage systems in accordance with embodiments of the invention.

FIG. 2 shows a block diagram of a user application 202 interacting with a storage system 200. Storage system 200 includes hard drive 217, non-volatile memory (NVM) drive 215, NVM driver 221, hard drive driver 223, pinning driver 206, pinning service 212, and pinning graphical user interface (GUI) 210. Hard drive 217 is a storage device such as a magnetic disk or optical disk. Hard drive 217 corresponds to media 170 (FIG. 1). NVM drive 215 is non-volatile memory that emulates a disk drive. In some embodiments, NVM drive 215 is also used as a non-volatile cache for hard drive 217. NVM drive 215 may use any type of non-volatile memory present in the system. For example, NVM drive 215 may employ PCM 152 (FIG. 1) or any of the FLASH memories of FIG. 1.

In operation, user application 202 reads and writes data from and to various sectors 204. In an example, the sectors 204 are physical storage locations where data relating to user application 202 is stored. In another example, the sectors 204 are virtual sector identifiers that are mapped to actual physical locations by the drivers. When user application 202 is performing a read or write, user application 202 identifies which sectors 204 are to be accessed, and provides this information to pinning driver 206. Pinning driver 206 determines whether to forward the access request to hard drive driver 223 for access to hard drive 217 or to NVM driver 221 for access to NVM drive 215.

In some embodiments, pinning driver 206 is not aware of files, directories, or other high-order constructs, but deals with sector access, for example, sector reads & writes. Pinning driver 206 supports special messages, e.g., input/output controls (IOCTLs), which instruct the driver to either pin sectors to the NVM drive 215 or to un-pin sectors, thereby allowing the system to determine where to store the sectors. Pinning driver 206 can communicate with a graphical user interface 210 and a pinning service that allows user input to control pinning.

The pinning driver 206 stores a list 208 of pinned sectors. The pinned sector list 208 is controlled by either GUI 210 or pinning service 212. The pinned sector list 208 represents the sectors that are chosen to be pinned to NVM drive 215. The pinned sector list 208 can be stored in a cache memory associated with pinning driver 206.

In operation, the pinning driver 206 acts as a front-end interface between the slower hard drive 217 and the faster NVM drive 215. Memory sectors being accessed by application 202 are checked for presence in the NVM drive 215; e.g., in pinned sector list 208. If the sectors 204 being accessed are in the pinned sector list 208, then the data of the sectors are accessed in the NVM drive 215. If the sectors 204 being accessed are not in the pinned sector list 208, then the data of the sectors are accessed in the hard drive 217. The pinning driver 206 also supports special messages (such as IOCTLS) which instruct the driver to pin or un-pin a list of sectors. This allows the pinning GUI and pinning service to manage which sectors are to be stored in NVM drive 215. Examples of the GUI and pinning service are described with reference to FIGS. 6 and 7.

Because pinning driver 206 is only aware of sectors, but users are interested in pinning files and directories, various embodiments of the invention include a pinning service software component 212 to provide a mapping between files and sectors. That is, given an input list of files/directories (f1, d1, d2, f3, . . . ), the pinning service 212 will output a list of sectors (s1, s21, s43, . . . ) that contain the listed files. Because files and directories which are not "read-only" can be updated, the list of used sectors can vary from one moment to the next. For example, if you edit the a document File1.doc and add a few new pages, it may use an additional sector on the disk. Since File.doc is marked by the user as "Pinned", we must take extra steps to pin the new sector(s). In some embodiments, the pinning service 212 runs periodically to check the list of currently pinned sectors against the list of sectors which should be pinned. The pinning service 212 removes any unnecessary sectors from the NVM drive, and pins any new sectors as well.

Figure 3:
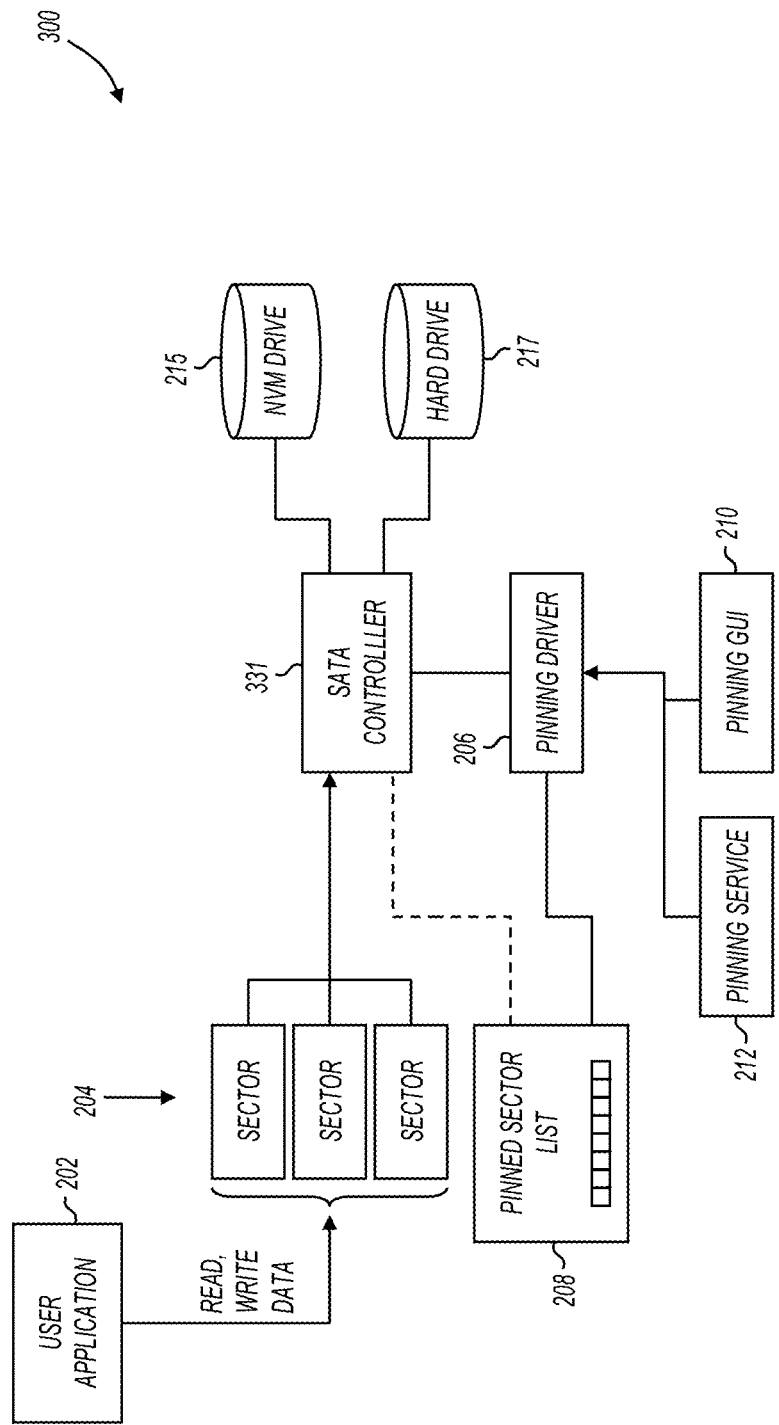

FIG. 3 shows a block diagram of a storage system 300 in which elements that are similar to the examples described with reference to FIG. 2 are identified with like reference numbers. As shown in FIG. 3, user application 202 communicates the data access required on a sector basis to a serial ATA ("SATA") controller 331 that in turn communicates with the NVM drive 215 and the hard drive 217. The SATA controller 331 controls the placement of sectors for select applications by instruction from the pinning driver 206, which maintains the pinned sector list 208. In an alternate example, the SATA controller 331 communicates with or stores the pinned sector list 208 so that the SATA controller can determine the pinned sectors and communicate with the correct bulk storage device, e.g., either the NVM drive 215 or the hard drive 217. The pinning driver 206 in this example operates to update the pinned sector list 208.

Figure 4:
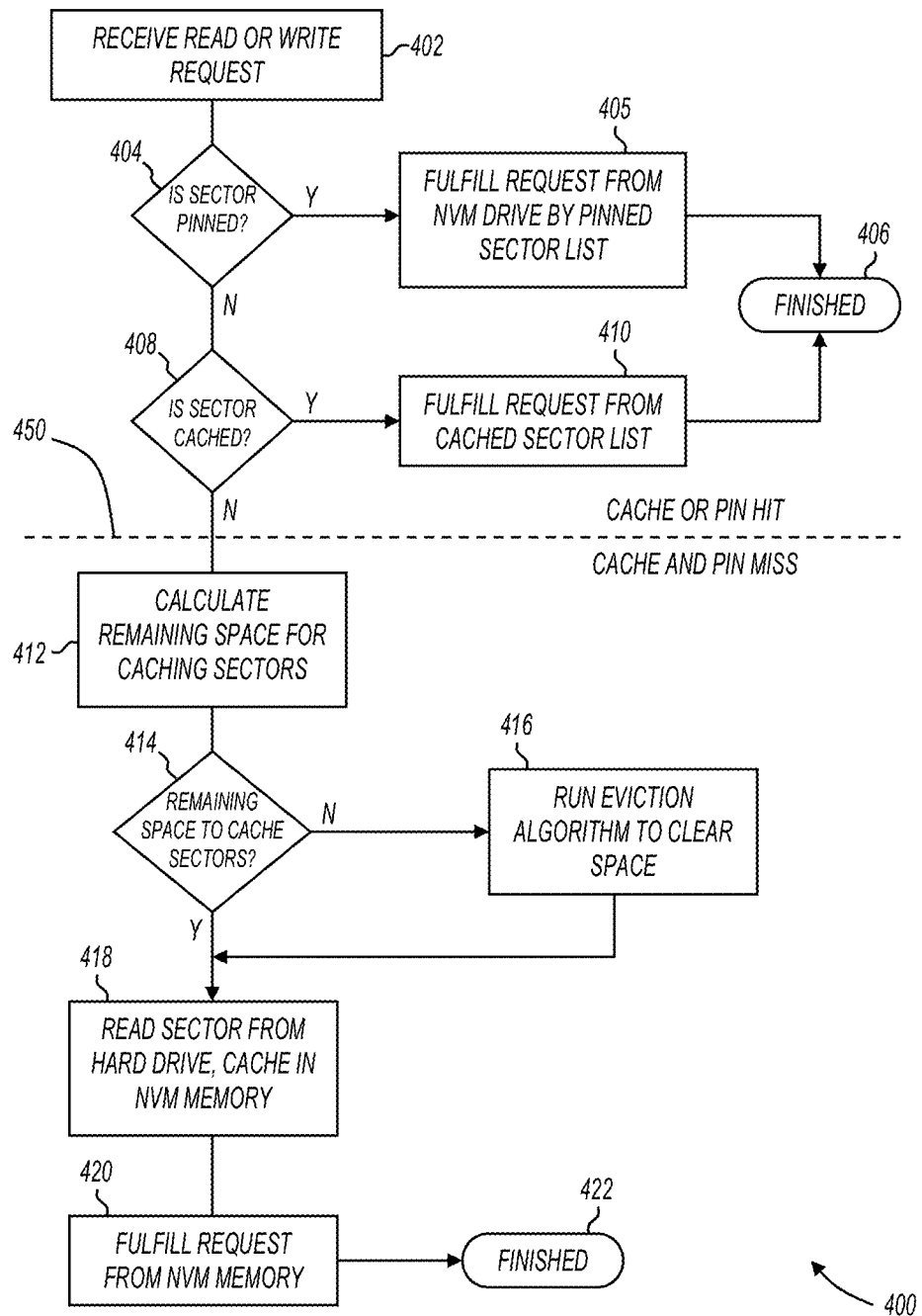
FIGS. 4 and 5 are flow diagrams in accordance with various embodiments of the invention.

FIG. 4 is a flow diagram in accordance with an embodiment of the present invention. In some embodiments, method 400, or portions thereof, is performed within a pinning driver software component such as pinning driver 206 (FIGS. 2, 3). In other embodiments, method 400 is performed by an integrated circuit or an electronic system. Method 400 is not limited by the particular type of apparatus performing the method. The various actions in method 400 may be performed in the order presented, or may be performed in a different order. Further, in some embodiments, some actions listed in FIG. 4 are omitted from method 400.

Method 400 is shown beginning with block 402 in which a request to read or write is received. This request can be at a file or directory level that is then interpreted to represent the sectors in which the file or directory is stored. For example, a file named "file1" is to be read for use by an application. The sector, e.g., s38, is determined to be the sector storing file1. Accordingly, sector s38 is the sector from which the file1 data will be read. At 404, it is determined whether the sector is pinned. If the sector is pinned, method 400 proceeds to 405. If the sector is not pinned, method 400 proceeds to 408. In some embodiments, a sector may be pinned to a NVM drive based on a user's input. Further, in some embodiments, sectors may be pinned by an algorithm in the device after it is determined that free, non-user pinned sectors remain in the NVM drive.

At 405, the request from 402 is fulfilled from the pinned sector in the NVM drive. Thereafter the flow ends at 406 until a new request is received (402). At 408, it is determined whether the sector is a cached sector. In an example, a cached sector is a sector storing a file, directory, or other data that the device has determined should be stored in a faster memory location, e.g., a fast bulk memory location such as an NVM drive. If the sector is cached, then the flow moves to 410. If the sector is not cached, then the flow moves to 412.

At 410, the request from 408 is fulfilled from the cached sector in the non-volatile memory. The cached sector may be stored in the NVM drive, or in an area of non-volatile memory not used for the NVM drive. The actions of method 400 described thus far relate to accessing data that is stored in nonvolatile memory; either in an NVM drive, or in a non-volatile cache. In other words, the actions above line 450 result in a data access if there is a cache hit or a "pin hit." If there is no cache hit or pin hit, then method 400 continues below line 450.

At 412, the method 400 addresses sectors that are not pinned and are not cached. At 412, the remaining space for caching sectors in the non-volatile memory. In some embodiments, this corresponds to determining the remaining space in an NVM drive. In other embodiments, this corresponds to determining the remaining space in a non-volatile memory cache that is not part of an NVM drive. At 414, it is determined whether the remaining space is adequate to cache further sectors. If not, then at 416 a cache eviction algorithm is run. This cache eviction algorithm removes sectors from the non-volatile memory cache to make room for new data to be cached. One example of an evictable sector is a sector that has been orphaned by closing its associated application. This sector can be moved to a slower bulk storage such as a hard drive or an NVM drive. Another example of an evictable sector is a sector that is not often accessed. This sector can be moved to a slower bulk storage such as a hard drive or an NVM drive. It will be recognized that a pinned sector cannot be moved from the NVM drive as a result of the actions at 416. If space has been cleared by 416 or there is space to cache a sector at 414, then the sector is read from the slower bulk storage, e.g., a hard drive, and cached in the non-volatile memory at 418. At 420, the request to access the sector is then fulfilled from the non-volatile memory. Thereafter the flow ends at 422 until a new request is received (402).

Figure 5:
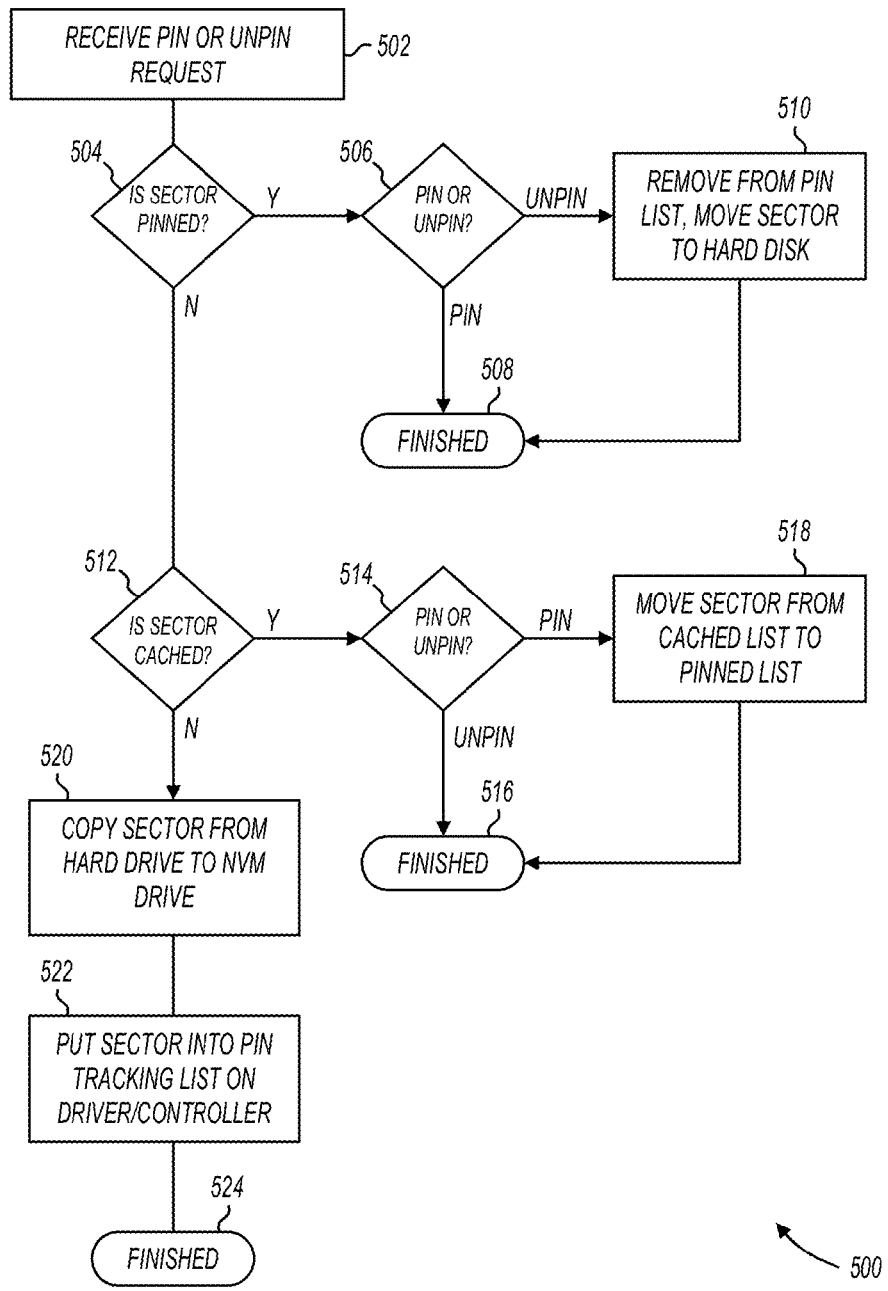

FIG. 5 is a flow diagram in accordance with an embodiment of the present invention. In some embodiments, method 500, or portions thereof, is performed within a pinning service software component such as pinning service 212 (FIGS. 2, 3). In other embodiments, method 500 is performed by an integrated circuit or an electronic system. Method 500 is not limited by the particular type of apparatus performing the method. The various actions in method 500 may be performed in the order presented, or may be performed in a different order. Further, in some embodiments, some actions listed in FIG. 5 are omitted from method 500.

Method 500 is shown beginning with block 502 in which a request to change the status of sector is received. The request can be to pin a sector to the faster NVM drive. The request can also be to unpin a sector from the faster NVM drive. At 504, it is determined whether the sector is currently pinned; e.g., whether the sector is listed in the pinned sector list 208 (FIGS. 2, 3). If the sector is pinned, then at 506 is it determined whether the request was to pin or unpin. If the request was to pin and the sector is already pinned, the method 500 ends at 508. If the request is to unpin a pinned sector, then at 510 the sector is removed from the pinned sector list and the sector is moved to a slower storage location such as a hard drive. Thereafter, the method 500 ends.

If at 504, it is determined that the sector subject to the request is not pinned, then the flow moves to 512. At 512, it is determined whether the sector is cached. If the sector is cached, then at 514 is it determined whether the request was to pin or unpin. If the request was to unpin and the sector is cached, the method 500 ends at 516. If the request is to pin a non-pinned and cached sector, then at 518 the sector is moved from the cached list to the pinned list. As the sector is already in the non-volatile memory, the physical contents of the sector need not move. The sector number need only be added to the list of pinned sectors, e.g., pinned sector list 208 as shown in FIGS. 2 and 3. Thereafter, method 500 ends at 516 until a new request is received at 502.

If at 512 it is determined that the sector is not cached then the flow moves to 520. At 520, the sector is copied from the hard drive to the NVM drive. At 522, the sector is added to the pinned sector list that is accessible by the driver (e.g., pinning driver 206) or the controller (e.g., controller 331). At 524, the flow of method 500 ends.

Figure 6:
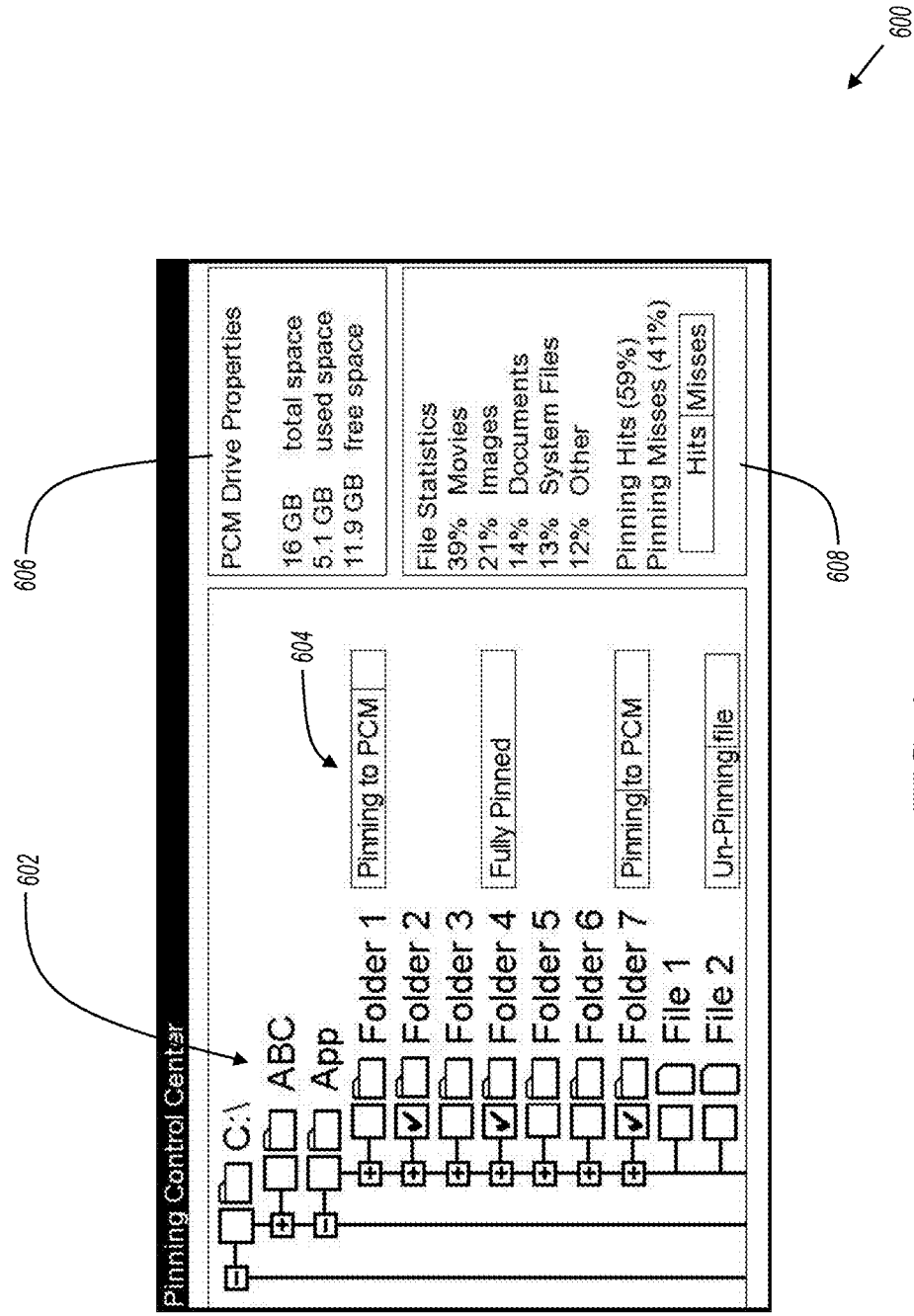
FIGS. 6 and 7 are diagrams of user interface components in accordance with various embodiments of the invention.

FIG. 6 is a diagram of a user interface in accordance with some embodiments of the present invention. The graphical user interface (GUI) 600 provides a means by which a user can indicate to a system that certain applications should have their data stored in an NVM drive or that certain files should have their data stored in an NVM drive. GUI 600 includes a title, here "Pinning Control Center", typical interface controls such as close, minimize, maximize, etc, and drop down menus such as file and options. The GUI 600 further shows a frame 602 that lists the contents of the C drive for the device at issue. Next to each application listed in the C drive are check boxes. These boxes are interactive and the user can check or uncheck any individual box utilizing a pointing device, e.g., mouse, touch pad or other user I/O device. In this example, the directories entitled "Hiring," "PCM," and "Shared" are selected. As a result, the data associated with these directories is stored in sectors that are pinned to an NVM drive. Other directories and files can have their sectors pinned to the NVM drive by checking the box next to their name in this listing of directories and files. As a result, the user can select the directories and files that are stored in faster memory.

In order to make informed choices about pinning an application(s) and/or a file(s), the user should be provided with statistics regarding the pinned sectors. At 604, statistics regarding pinned sectors is shown. The number of sectors currently being pinned out of the total to be pinned in this operation is shown. The number of fully pinned sectors is shown. The number of sectors flushed from the NVM drive out of the totals to be flushed is shown. These show the user the status of any updates to pinned and unpinned sectors.

At 606, the NVM drive properties are shown. In the example of FIG. 6, the NVM drive is implemented using PCM and is referred to as a PCM drive. The total size of the PCM drive is shown, here by way of example, as 16 GB. The used space, here by way of example, 5.1 GB, and the free space, here by way of example, 11.9 GB, are both shown. The number of dirty sectors that would need to be moved to the hard drive if unpinned is also shown, here by way of example, 1,200 dirty sectors. The numerical examples are provided to illustrate one possible state of a system with an NVM drive. It will be recognized that the present invention need not be limited to these specific examples unless claimed. At 606, a graphic illustration of the total size, used space, and available space is shown to efficiently convey this data to a user.

At 608, further statistics regarding the files that are stored in pinned sectors is shown. The file types are listed with respective percentages of the whole of the pinned files. In the illustrated example, movie files are 39% of the total pinned files; image files are 21%; documents are 14%; system files are 13%; and other files are 12%. A graphical image is provided to show these percentages. A further indication of the pinning hits and misses is shown. This shows the percentage of sectors accessed that are pinned (hits). The misses are the percentage of sectors accessed that are not pinned. A brief listing of the most used files is shown. These files indicate good candidates for sectors to pin.

In some embodiments, a GUI may be incorporated into a graphical shell. For example, pinning controls may be incorporated into a context menu in a Microsoft Windows shell to improve the user's experience. One example of such a GUI is described below with reference to FIG. 7.

Figure 7:
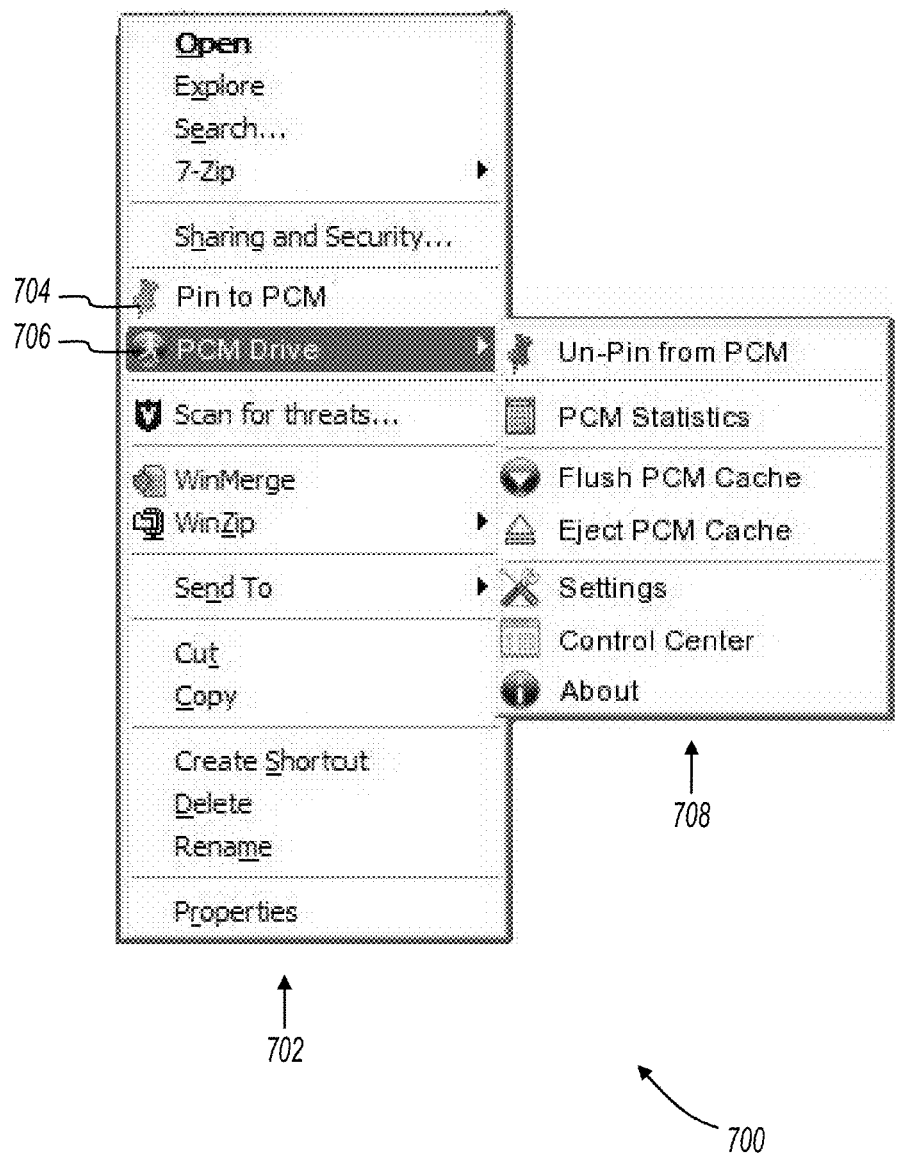

FIG. 7 is a diagram of a user interface 700 in accordance with some embodiments. The graphical user interface (GUI) 700 is an example of a context menu or icon overlay menu that allows a user to pin data to, or unpin data from, an NVM drive. The GUI 700 also allows a user to control NVM cache.

In some embodiments, a right click on an icon can bring up this GUI 700. GUI 700 includes various user initiated functions such as open, explore, search, winzip, winmerge, send to, cut, copy, delete, rename, properties, etc. This is not an exhaustive list and the list can be modified in certain applications. The properties command can provide a link to the GUI 600 in an example.

The two commands of interest for the pinning of files are the Pin to PCM 704 and the PCM drive 706. The Pin to PCM 704 pins the current file to the NVM drive, e.g., a PCM drive. The PCM drive 706 displays another menu 708 when selected. Menu 708 includes a plurality of user selectable commands. These commands can include Un-Pin from PCM, PCM Statistics, Flush PCM Cache, Eject PCM cache, Settings, Control Center, and About. Un-pin from PCM will remove the sectors associated with the current file from the NVM drive. PCM statistics will pull up statistics similar to those described above with regard to FIG. 6. Flush PCM cache will remove the sectors that are in the NVM drive but are unpinned. In an example, these cached sectors are moved to the hard drive if they are dirty. Eject PCM cache moves all sectors that are unpinned from the persistent memory drive to the hard drive. Settings pulls up a settings menu. Control Center takes the user to the GUI 600.

Figure 8:
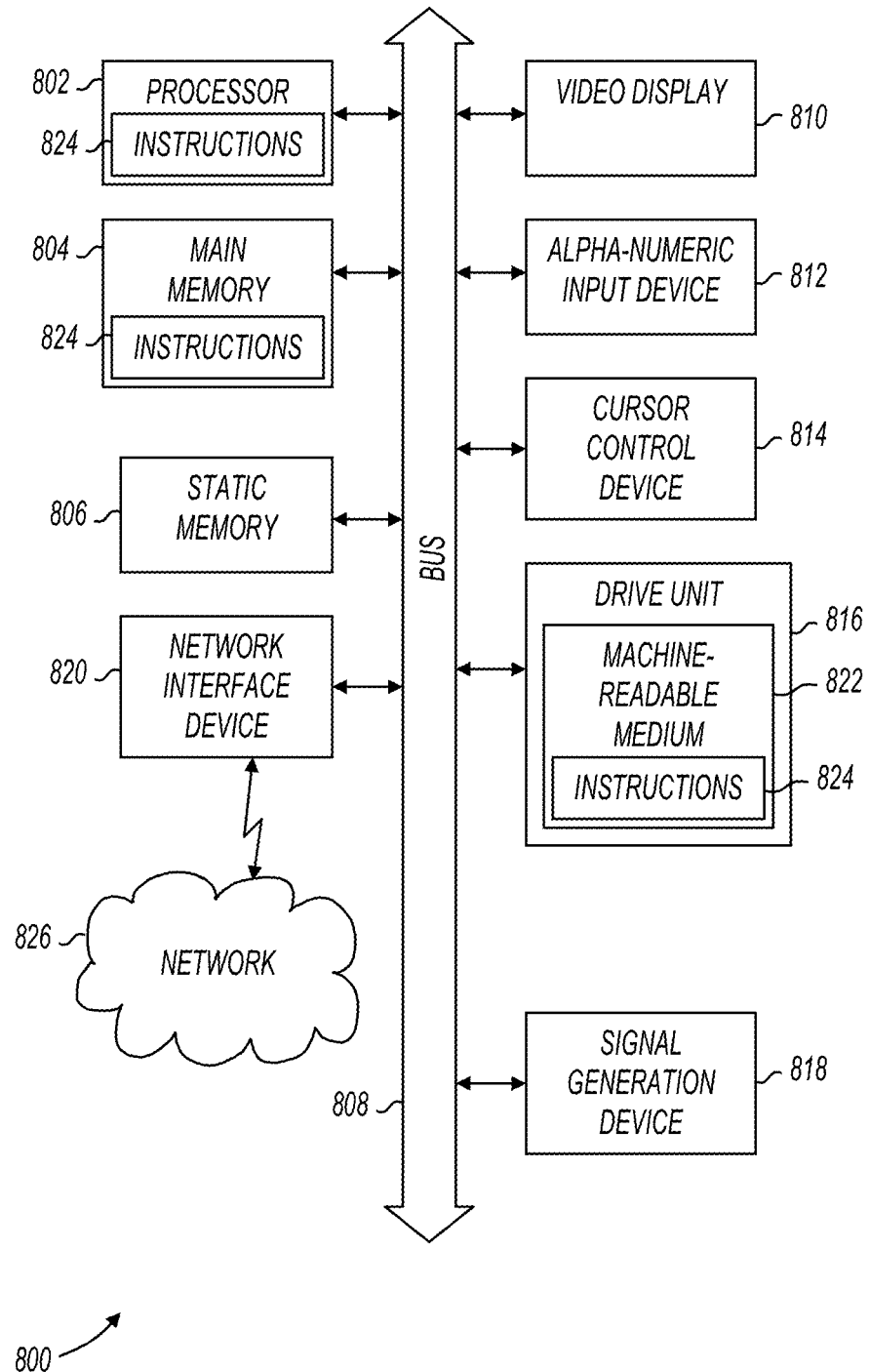
FIG. 8 shows an electronic device in accordance with some embodiments of the present invention.

FIG. 8 shows an electronic device 800 in accordance with some embodiments. The device 800 is shown as a diagrammatic representation of machine in the example form of a computer system within which a set of instructions may be executed causing the machine to perform any one or more of the methods, processes, operations, applications, or methodologies discussed herein. In an example embodiment, the device 800 operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The device 800 includes a processor 802 (e.g., a central processing unit (CPU) a graphics processing unit (GPU) or both), a main memory 804 and a static memory 806, which communicate with each other via a bus 808. The computer system 800 further includes a video display unit 810 (e.g., a liquid crystal display (LCD) or a cathode ray tube (CRT)). The video display unit 810 displays graphical user interfaces 600, 700. The computer system 800 also includes an alphanumeric input device 812 (e.g., a keyboard), a cursor control device 814 (e.g., a touchpad), a drive unit 816, a signal generation device 818 (e.g., a speaker) and a network interface device 820. The drive unit 816 represents both a hard drive or an NVM drive that can store data and applications.

The drive unit 816 includes a machine-readable medium 822 on which is stored one or more sets of instructions (e.g., software instructions 824) embodying any one or more of the methodologies or functions described herein. The software instructions 824 may also reside, completely or at least partially, within the main memory 804 and/or within the processor 802 during execution thereof by the computer system 800, the main memory 804 and the processor 802 also constituting computer-readable media. The software instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

An algorithm is described herein, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. All of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "monitoring," "storing," "detecting," "using," "identifying," "marking," "receiving," "loading," "reconfiguring," "formatting," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
  receiving at a pinning service a first list of files that are to be stored "pinned" in a non-volatile memory (NVM) drive that emulates a disk drive;
  mapping the list of files to a first list of disk sectors that are to be pinned in the NVM drive;
  pinning the sectors corresponding to the first list of disk sectors in the NVM drive;
  displaying at a graphical user interface (GUI) hit statistics and miss statistics corresponding to the pinned sectors, wherein hit statistics correspond to pinned sectors and miss statistics correspond to sectors not pinned;
  receiving from the GUI a second list of files selected by a user to be pinned or unpinned in the NVM drive, wherein the second list of files is selected by the user after displaying the hit statistics and miss statistics;
  mapping the second list of files to a second list of disk sectors that are to be pinned or unpinned in the NVM drive; and
  pinning or unpinning the sectors corresponding to the second list of disk sectors in the NVM drive.

2. The method of claim 1 wherein the NVM drive utilizes phase change memory (PCM).

3. The method of claim 1 further comprising receiving a request to remove a file "unpin" from the NVM drive.

4. The method of claim 1 further comprising periodically updating the list of disk sectors.

5. The method of claim 1 further comprising caching data in the NVM drive.

6. The method of claim 1 wherein the NVM drive comprises FLASH memory.

7. A non-transitory machine readable medium having instructions stored thereon that when accessed cause a machine with a non-volatile memory (NVM) drive that emulates a disk drive to perform:
  receiving a media access request that identifies at least one sector of a data file;
  determining if sectors corresponding to the data file are pinned to the NVM drive;
  if pinned, fulfilling the request from the NVM drive;
  determining if the at least one sector is cached to the NVM drive;
  if cached, fulfilling the request from the NVM drive;
  displaying at a graphical user interface (GUI) hit statistics and miss statistics corresponding to pinned sectors in the NVM drive, wherein hit statistics correspond to pinned sectors and miss statistics correspond to sectors not pinned;
  receiving from the GUI a list of files selected by a user that are to be pinned or unpinned in the NVM drive, wherein the list of files is selected by the user after displaying the hit statistics and the miss statistics;
  mapping the list of files to a list of disk sectors that are to be pinned or unpinned in the NVM drive; and
  pinning or unpinning the sectors corresponding to the list of files in the NVM drive.

8. The machine readable medium of claim 7 wherein the instructions when accessed result in the machine further performing:
  if not pinned or cached, calculate free space in the NVM drive, and if free space is sufficient, cache the at least one sector to the NVM drive.

9. The machine readable medium of claim 8 wherein the instructions when accessed result in the machine further performing:
  if free space in the NVM drive is not sufficient, then running a cache eviction algorithm to free cache space, and caching the at least one sector in the NVM drive.

10. The machine readable medium of claim 9 wherein the instructions when accessed result in the machine further performing fulfilling the request by accessing the at least one sector from the NVM drive.

11. The machine readable medium of claim 7 wherein fulfilling the request from the NVM drive comprises accessing phase change memory (PCM).

12. The machine readable medium of claim 7 wherein fulfilling the request from the NVM drive comprises accessing FLASH memory.

13. The machine readable medium of claim 7 wherein the instructions when accessed result in the machine further performing:
  if not pinned or cached, fulfilling the request from media other than the NVM drive.

14. The machine readable medium of claim 7 wherein determining if the at least one sector is pinned to the NVM drive comprises accessing a list of pinned sectors.

15. An electronic system comprising:
  a hard drive;
  a non-volatile memory (NVM) drive configured to emulate a disk drive;
  a pinning user interface configured to allow a user to select data files to be pinned to the NVM drive, the pinning user interface further configured to display to the user hit statistics and miss statistics, wherein the hit statistics correspond to the pinned data files and the miss statistics correspond to data files not pinned, the pinning user interface further configured to allow the user to select data files to be pinned after the display of the hit statistics and the miss statistics, wherein the selected data files to be pinned comprise a user-selected list, and wherein the pinning user interface is further configured to map the user-selected list of files to a list of sectors to be pinned or unpinned in the NVM drive;

a pinning service configured to map the pinned data files to sectors and configured to output a pinned sector list that is a list of sectors that are to be pinned to the NVM drive; and a pinning driver component configured to pin or unpin the sectors corresponding to the user-selected list and the pinned sector list, the pinning driver component further configured to receive read/write requests, and the pinning driver component further configured to access the NVM drive based on contents of the pinned sector list and the user-selected list.

16. The electronic system of claim 15 further comprising a pinning service component to periodically update the pinned sector list.

17. The electronic system of claim 15 wherein the NVM drive comprises phase change memory (PCM).

18. The electronic system of claim 15 wherein the NVM drive comprises FLASH memory.

* * * * *

UNITED STATES PATENT AND TRADEMARK OFFICE
CERTIFICATE OF CORRECTION

| | | |
|---|---|---|
| PATENT NO. | : 8,719,486 B2 | Page 1 of 1 |
| APPLICATION NO. | : 12/490501 | |
| DATED | : May 6, 2014 | |
| INVENTOR(S) | : Samuel D. Post et al. | |

It is certified that error appears in the above-identified patent and that said Letters Patent is hereby corrected as shown below:

On the title page, item (56), under "Other Publications", in column 2, line 1, delete "Gereal" and insert -- General --, therefor.

In the Claims:

In column 9, line 52, in Claim 1, delete "statistics:" and insert -- statistics; --, therefor.

Signed and Sealed this
Thirtieth Day of September, 2014

Michelle K. Lee
*Deputy Director of the United States Patent and Trademark Office*